Sept. 30, 1958  S. T. WILLIAMS  2,854,020
TIRE VALVE INFLATION CAP OR EXTENSION
Filed June 28, 1956
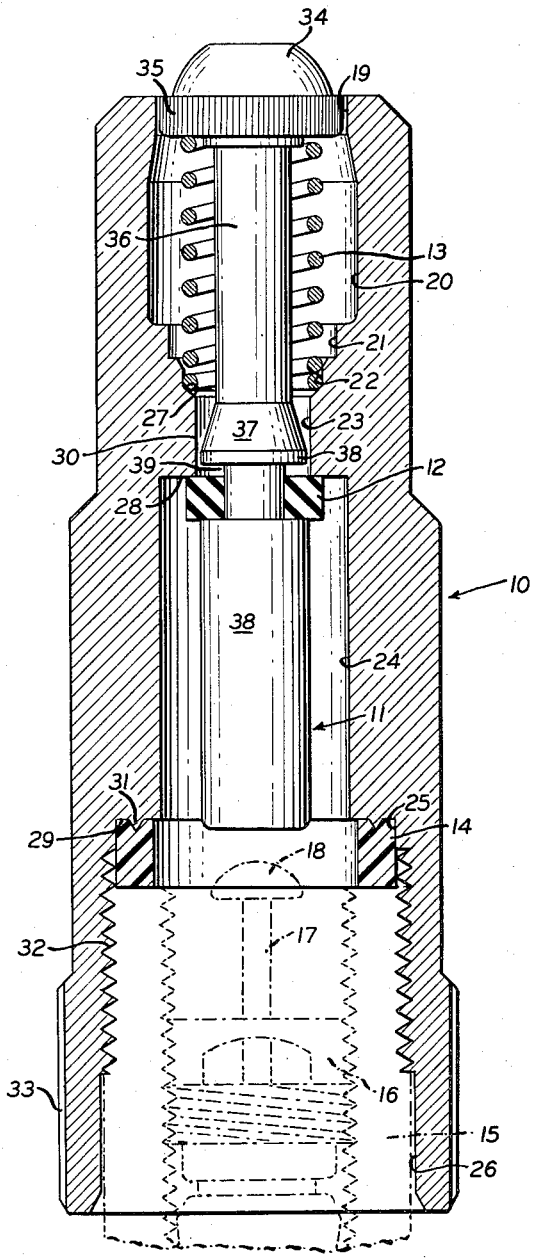
INVENTOR
SELDEN T. WILLIAMS.
BY
Churchill, Rich, Waymouth & Engel
ATTORNEYS.

United States Patent Office 2,854,020
Patented Sept. 30, 1958

2,854,020

TIRE VALVE INFLATION CAP OR EXTENSION

Selden T. Williams, Bellerose, N. Y., assignor to Scovill Manufacturing Company, Waterbury, Conn., a corporation of Connecticut Application June 28, 1956, Serial No. 594,503

2 Claims. (Cl. 137—232)

The present invention relates to fluid check valves and more particularly to a tire valve stem inflation cap or extension containing a check valve, and aims to provide certain improvements therein.

During the past 25 years inflating valve caps have been used on tire valve stems to facilitate inflating the tire without removal of the cap and also to serve as an extension for the valve stem, particularly when used on wheels fitted with discs. In such inflating caps or extensions there is incorporated a spring-pressed check valve to provide a secondary seal for the tire valve, which latter is adapted to be unseated by depressing the valve pin of the inflating cap valve when inflating or gauging a tire. Because of the secondary seal provided by the check valve within the inflating cap, the cost thereof is increased and, rather than pay more, many motorists used valve extensions without a secondary seal therein. Recently, however, inflating caps or extensions are being increasingly used as extensions for short tire valve stems, especially in connection with wheels having discs for the adornment thereof.

The present invention has among its objects (1) to provide a fluid check valve of the spring-seated type wherein the check valve washer serves the dual function of providing a closure seal and of holding the valve check elements in assembled relation, and (2) to provide a check valve construction which, when incorporated in a tire valve stem inflation cap or extension, is simpler than former devices while still retaining the secondary seal; which is made from fewer component parts and hence less costly to produce; and which can be made in different lengths to cooperate with valve stems of different length and thereby provide extensions of varying lengths as may be desired.

The foregoing and other objects of the invention, not specifically enumerated, are accomplished by the check valve comprising a tubular body having a through opening formed intermediate its ends with an internal rib providing a valve seat, a valve pin movable within said tubular body and having an intermediate portion thereof slidable in the bore portion of said internal rib, the valve pin having an enlargement at the outer end thereof slidable in the bore at the outer end of the body, a helical spring encompassing the valve pin and bearing at one end against said enlargement and at its other end seating on the internal rib, and an elastic deformable sealing washer mounted on said pin axially inward of said intermediate portion thereof cooperating with said valve seat and serving to lock the valve pin and spring into the body and hold the spring under compression. When the check valve is incorporated in an inflation cap or extension for a tire valve stem, the pin extension below the sealing washer is made of different lengths to cooperate with barrels of different lengths and thereby provide extensions of different lengths, as may be desired. The sealing washer is preferably slidably mounted in an annular groove on the pin so as to be free to adjust and seat against the body under the combination of forces provided by the spring and the air pressure.

The invention and its advantages will be better understood from the detailed description which follows when considered in connection with the accompanying drawing which shows a diametrical section through the novel valve check embodied in a valve stem inflating cap or extension, the valve pin of which is shown in elevation and the cap is shown in its relation to a tire valve stem when mounted thereon.

Referring to the drawing the check valve may be said to consist of the following parts: a one piece tubular body or barrel 10, a valve pin 11, a sealing washer 12 and a helical spring 13. Where the check valve is formed as part of an inflating cap or extension, the tubular body is provided with a packing washer 14 for making a seal with the end of a conventional tire valve stem 15 having mounted therein a valve core or insides 16, the valve pin 17 of which terminates approximately at the mouth end of the valve stem 15 and is formed with an enlarged head 18.

The body 10 at its outer end has a smooth external diameter equal to the external diameter at the outer end of the conventional valve stem 15 adapted to accommodate a conventional inflating chuck. The bore through the body is formed with portions of different diameters 19, 20, 21, 22, 23, 24, 25 and 26, which provide, in addition to others, shoulders 27, 28 and 29. As herein indicated, the shoulders 27 and 28 may be said to define an internal annular rib 30 having the bore 23 which is of smallest diameter of the various bore portions in the body. If desired, the bores 19, 20, 21 and 22 may have a common diameter larger than the bore 23. As shown, the bore portion 19 is of smaller diameter than the bore portion 20, for a reason which will presently appear. The shoulder 28 is preferably flat and constitutes the valve seat for the sealing washer 12. The shoulder 29 is formed with an annular tooth-shaped rib 31 for engaging the packing gasket 14 to provide a leak-tight seal therewith. The bore portion 25 is internally screw-threaded, as shown at 32, for engagement with the external screw-threads on the nipple of the valve stem. The end of the body provided with the bore portion 19 is hereinafter referred to as the outer end of the body and the end containing the bore portion 26 is hereinafter referred to as the inner end of the body. The inner end of the body is externally knurled as shown at 33, to facilitate threading the inflating valve cap onto the valve stem.

The valve pin 11 is formed at its outer end with a dome-shaped enlargement 34 having axially directed peripheral knurling 35 adapted to slidably engage through the bore portion 19 and provide a substantial closure for the outer end of the cap. Below the head 34 the valve pin portion 36 is of reduced diameter for a length normally extending to approximately the shoulder 27, whereat said pin has an outwardly tapered portion 37 terminating in a cylindrical portion 38 of a diameter to slidably engage in the bore 23 of the rib 30. Adjacent the outer end of the portion 38 the valve pin is formed with an external annular or peripheral groove 39 within which the sealing washer 12 elastically seats. The groove 39 provides the pin with an annular shoulder upon which the washer 12 can seat. The axial length of the groove 39 is preferably somewhat greater than the thickness of the washer 12 so that the washer is axially movable within said groove. The length of the valve pin 11 is such that the inner end thereof is normally disposed to lie within the packing washer 12. The packing washer 12 is preferably formed of elastic rubber, is of flat tubular or disk-like form of less axial dimension than the groove 39 and is adapted to be forced over the inner end of the pin 11 and snap into and elastically engage the base of the groove 39. When mounted in said groove the washer 12 has an external diameter larger than the diameter of the pin portion 38 and also larger than the bore portion 23 so that it will engage the shoulder 28 which constitutes the valve seat and serves the dual function of providing a closure seal and locking the valve pin assembly into the body.

The spring 13 is of helical form and encompasses the valve pin portion 36, one end of the spring bears against the inner face of the dome-shaped enlargement 34 and the other end of said spring bears against or seats upon the shoulder 27. It will be apparent that the spring urges the valve pin outwardly to seat the rubber washer 12 upon the valve seat 28 and positions the knurled portion 35 of the enlargement 34 within the bore portion 19. It will also be apparent that when the enlargement 34 is pressed inwardly by engagement with an inflating chuck or press-on foot of a pressure gauge, that the sealing washer 12 will be unseated and the passage through the bore portion 19 will be opened for the passage of air therethrough.

The packing washer 14 is preferably formed of nylon and is force-fitted into the bore portion 25 so that the annular tooth 31 bites into the washer to hold the same in place and insure a leak-tight seal between the body 10 and the end of a tire valve stem when the body is screw-threaded thereon.

The body 10 and the valve pin 11 are each preferably formed of single pieces of material, preferably metal, and readily lend themselves to production on a screw machine. It will also be noted that the inflating cap or extension is formed of but five parts, as compared with twice the number required for producing inflating valve caps heretofore commonly used to hold air. The design and construction of the inflating valve cap lends itself to efficient assembly and without recourse to any mechanical heading or riveting operations to maintain the parts in assembled relation.

In one procedure of assembling the various parts, the spring is first positioned over the valve pin portion 36 before the sealing washer 12 is mounted thereon. While supporting the valve pin and spring in inverted position, i. e., with the enlargement 34 downward, the pin and spring are inserted into the outer end of the body or the outer end of the valve body is positioned over the valve pin to hold the spring under compression so that the groove 39 will be located above the shoulder 28, and with the parts held in said position the sealing washer 12 is stretched and pushed over the portion 38 of the valve pin until the sealing washer snaps into the groove 39. To facilitate such stretching the inner end of the valve pin may be chamfered or rounded as shown. When the sealing washer has been thus mounted on the valve pin and the force of the body relieved, the washer 12 will engage the valve seat 28 and will lock the valve pin and the spring in assembled relation in the body 10 and hold the spring under compression. Because of the slidable mounting of the sealing washer in the groove of the pin, the washer is free to adjust to the seat on the body especially under the combination of forces provided by the spring and air pressure when the device is mounted on a valve stem connected to a container of air under pressure. This provides a highly efficient seal against leakage through the inflating valve cap when mounted on a valve stem.

In making the inflating valve cap or extension of different lengths to provide extensions of various lengths as may be desired, it will be understood that the length of the valve body portion and that of the valve pin, between their outer ends and the valve seat 28 and groove 39, respectively, will be constant, as will also be the length of the valve body portion between the shoulder 29 and the inner end of the body, while the length of the valve pin portion 38 below the washer 12 will vary and be substantially equal or slightly less than the variable length of the valve body portion between the washers 12 and 14.

While I have shown and described an embodiment of my invention applied to an inflating valve cap or extension, it is to be understood that analogous constructions of check valves may be provided for other uses and that changes in details of construction and assembly may be resorted to within the range of mechanical skill without departing from the spirit of the invention as claimed.

What I claim is:

1. A check valve comprising a tubular body having a through axial bore formed with an internal annular rib spaced from the outer end of the body, the inner end of the rib providing a valve seat; a movable valve pin inserted through said bore from the outer end of the body, said valve pin having an integral enlargement at its outer end slidable in the bore above the rib, a portion spaced axially inwardly from said enlargement having a diameter slidable in the bore of the rib and formed with a peripheral groove having flat side walls, and a connecting portion between said enlargement and said last mentioned portion, of smaller diameter than said bore in the rib; cooperating means on said enlargement and the bore above the rib providing for passage of fluid in the bore over said enlargement; a helical spring encircling the connecting portion of the valve pin and bearing at one end against said enlargement and at its other end seating against a shoulder on the internal rib; and a flat disk-like, elastic, deformable, sealing washer stretched over the inner end of the valve pin and seated in the peripheral groove, said sealing washer being of larger radial dimension than the depth of the peripheral groove, of larger diameter than the bore through the internal rib, of less axial dimension than the peripheral groove and elastically slidably held in said groove, said washer cooperating with the valve seat to provide a sealing closure and for locking the valve pin and spring within the body with the spring under compression, and said washer when mounted on the valve pin being incapable of passage through the bore of the internal rib from either end thereof, the slidable engagements between the valve pin portions aforementioned and the bore of the tubular body serving to guide and center the valve pin in its movements and permitting passage of fluid through the bore of the tubular body when the valve is unseated.

2. A tire valve inflating cap or extension, comprising a one-piece tubular body the bore of which has different diameters providing internal shoulders, a bore portion of smallest diameter being intermediate the ends of the body and providing with an adjacent axially inward bore portion of larger diameter a shoulder constituting a valve seat, a one-piece valve pin having a portion thereof intermediate its ends freely slidable in the aforementioned bore portion of smallest diameter, said valve pin axially inwardly adjacent said intermediate portion thereof being formed with a peripheral groove having flat side walls and axially outwardly of said portion being of reduced diameter and terminating at its outer end in an integral enlargement which is slidable in the bore portion of the body at the outer end thereof, cooperating means on said enlargement and the bore above the bore portion of smallest diameter providing for passage of fluid in the bore over said enlargement, a helical spring encircling the valve pin portion of reduced diameter and bearing at its outer end against said enlargement and at its inner end against a shoulder within the bore of the body, a flat disk-like elastic deformable sealing washer seated in the peripheral groove, said washer being of larger radial dimension than the depth of said groove, of larger diameter than said bore portion of smallest diameter, of less axial dimension than said groove and elastically slidably held in said groove, said washer being stretched over the inner end of the pin and allowed to snap into the groove and urged by said spring into engagement with said valve seat and serving to lock the valve pin and spring within the body with the spring under compression, the said washer when mounted on the valve pin being incapable of passage through the bore portion of smallest diameter from either end thereof, the slidable engagement between the valve pin portions aforementioned and the bore of the tubular body serving to guide and center the valve pin in its movements and permitting passage of fluid through the bore of the tubular body when the valve is unseated, the tubular body at its inner end being internally screw threaded for attachment to a tire valve stem, a packing washer mounted on the body at the inner end of the screw threaded portion and the valve pin being of a length such that its inner end when the valve is seated is disposed axially inwardly of the exposed end of the packing washer.

References Cited in the file of this patent

UNITED STATES PATENTS

| | | |
|---|---|---|
| 1,313,554 | Nielsen | Aug. 19, 1919 |
| 1,868,165 | Hammond | July 19, 1932 |
| 1,973,799 | Crowley | Sept. 18, 1934 |
| 2,154,255 | Williams | Apr. 11, 1939 |
| 2,240,129 | Broecker | Apr. 29, 1941 |
| 2,358,228 | Hoof | Sept. 12, 1944 |
| 2,554,747 | Lee | May 29, 1951 |

FOREIGN PATENTS

| | | |
|---|---|---|
| 987,487 | France | Apr. 18, 1951 |